3,064,753
REPETITIVE SEISMIC WAVE SOURCE
Carroll D. McClure, Rockport, Tex., assignor, by mesne assignments, to Socony Mobil Oil Company, Inc., New York, N.Y., a corporation of New York
Filed Feb. 9, 1959, Ser. No. 791,985
3 Claims. (Cl. 181—.5)

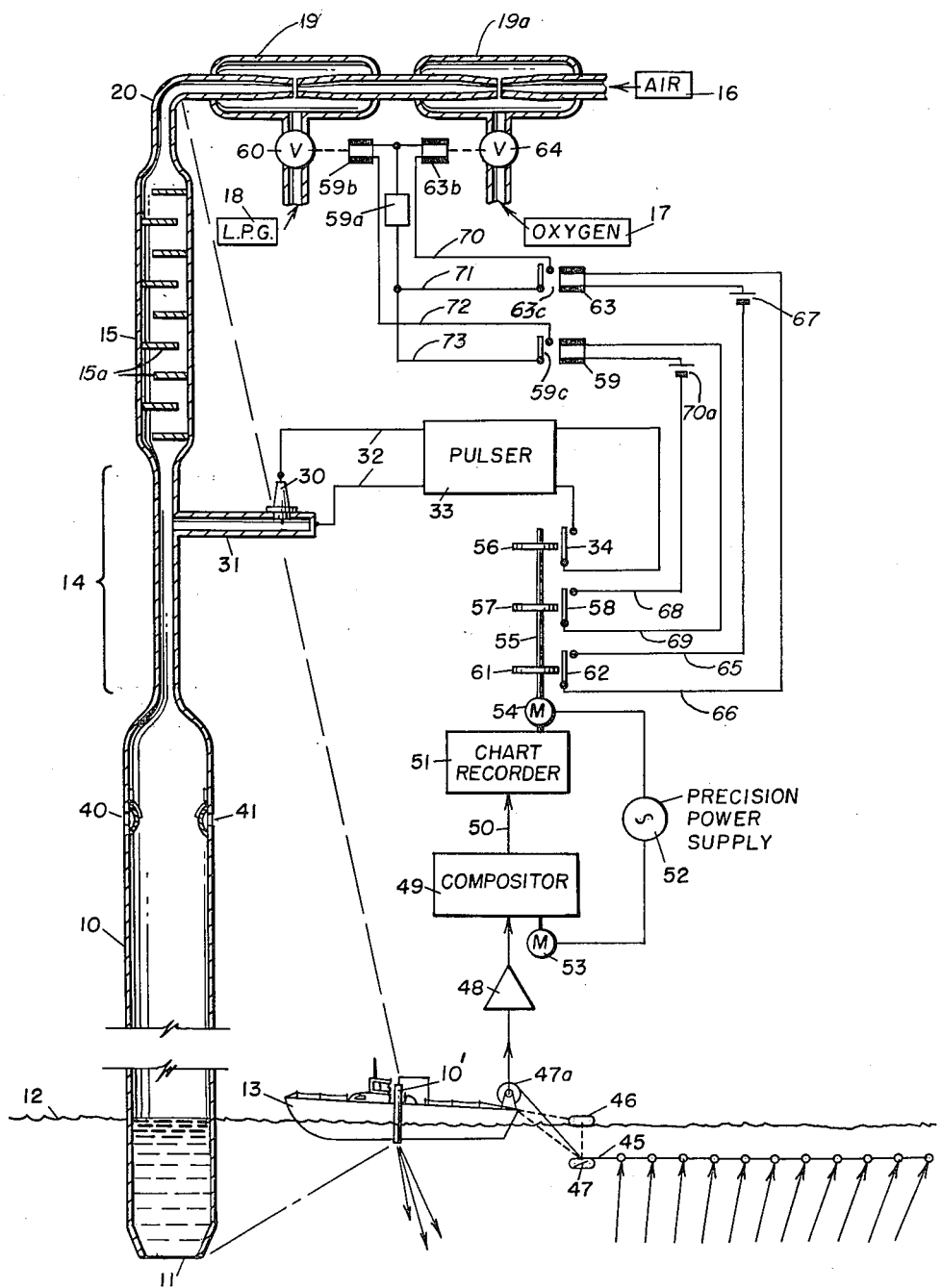

This invention relates to seismic exploration and more particularly to operations involving a repetitive seismic pulse source.

In copending application Serial No. 600,804, filed July 30, 1956, now U.S. Patent No. 2,994,397, of William B. Huckabay, a co-worker of applicant, there is disclosed a seismic energy source in which mixtures of air and a combustible fluid such as propane are repetitively ignited at the upper end of an elongated tube, the lower end of which is liquid-coupled to the earth by immersion in a water body. As combustion travels downward, the velocity increases toward detonation velocity, the resultant wave or flame front probably reaching a terminal velocity at the surface of the water substantially in excess of the velocity of sound in air. The impact of the detonation wave on the surface of the water produces sound wave which may be employed in accordance with well-known reflection seismograph procedures.

It is an object of the present invention to provide an improved seismic source in which reliable repetitive operation is achieved and more particularly in which there is provided a source having an igniter maintained free from fouling by reason of low pressures produced in the wake of each detonation wave.

In accordance with the invention, there is provided a device for producing seismic impulses which comprises an elongated tubular member having at least three zones. These zones include a top combustion zone having means adapted to be connected to a source of fuel and an ignition means, an intermediate zone having at least one inwardly opening valve therein, and a lower immersion zone adapted to be inserted in a body of water or the like.

In a more specific aspect there is provided a seismic source in which an elongated flow channel, repetitively loaded with a combustible gas mixture, is adapted to be coupled to the earth by fluid at an outlet end thereof. An igniter located in the region of the inlet end of the flow channel is periodically excited to ignite the mixture. A resultant combustion wave travels along the flow channel toward the outlet end. Structure is then provided to prevent fouling of the igniter by the fluid which tends to enter the flow channel following the arrival of each combustion wave at the outlet end.

In accordance with one aspect of the invention, the igniter is mounted in a chamber which is offset from the flow channel but in communication therewith. In accordance with a further aspect of the invention, structure responsive to pressure outside the flow channel greater than the pressure inside the flow channel is operable to introduce atmospheric air into the flow channel in responsive to the low pressure in the wake of each wave.

Thus, in accordance with the present invention, there is provided an elongated flow channel adapted to be repetitively loaded with a combustible gas mixture and coupled to the earth at an outlet end thereof. An igniter is supported at the end of said flow channel opposite said outlet end and is adapted periodically to ignite said mixture preferably for producing a detonation wave which travels along the length of the channel to the outlet end. Structure is then provided for preventing fouling of the igniter by fluid which tends to flow into the channel following each detonation wave.

For a more complete understanding of the present invention and for further objects and advantages thereof, reference may now be had to the following description taken in conjunction with the accompanying drawings in which:

FIG. 1 diagrammatically illustrates the present invention.

A detonation tube operated as a source of seismic waves has been found to be particularly adapted for seismic exploration over submerged terrain. However, in the process of combustion and detonation of an explosive gas mixture combustion products are discharged from the muzzle of the tube creating lower pressure inside the tube than outside. As a result, the liquid-coupling medium at the muzzle of the tube tends to be drawn into the tube with considerable force. A seismic energy source of this type offers distinct advantages over other sources where generation of repetitive, high energy, low frequency acoustic pulses are desired. However, water in the tube is deleterious, tending to short-circuit the igniter system and prevent reliable operation. As well understood, certain operations require seismic pulses spaced uniformly in time. In order to satisfy this requirement, applicant has provided means for preventing fouling of the igniter.

In FIG. 1, a source tube 10' is supported on a boat 13 with its axis vertical and the outlet or muzzle thereof immersed beneath the surface of a body of water 12. For purposes of illustration, an enlargement of tube 10' has been included in FIG. 1 and identified as tube 10.

Detonation tube 10 has a large diameter lower portion and an upper portion 14 substantially reduced in diameter. The upper portion of section 14 is connected to a mixing chamber 15. A combustible gas mixture is employed in tube 10 comprising air from source 16, oxygen from source 17 and a combustible fluid such as propane from a liquefied petroleum gas (L.P.G.) source 18, in suitable proportions. The mixture is fed by way of channel 20 to the mixing chamber 15. The mixture then flows into section 14 and thence downward into the lower enlarged section of the detonation tube 10 and out of the tube through the outlet 11. In practice, the flow of air is maintained continuously. The flow of oxygen and propane may be either intermittent or continuous as hereinafter discussed. Movement of the boat 13 along a given course will then permit repeated detonation of the gas mixture by energizing an igniter 30 to produce seismic pulses at any desirable pulse repetition rate.

In accordance with the invention, structure is provided effectively to shield the igniter 30. More particularly, a short pipe forming a stub chamber 31 is mounted on and extends perpendicularly from the upper section 14 of the detonation tube. The igniter 30, conveniently in the form of a spark plug, is mounted in the stub chamber offset from the direct path of gas flow in unit 10. Igniter 30 is connected by way of conductors 32 to an electrical pulser 33. Pulser 33 is actuated by control element 34 periodically to excite the igniter 30 to generate a spark in the combustible gas mixture to initiate combustion. Combustion of the gas mixture begins in the stub chamber 31 and proceeds to section 14. The flame front then travels in both directions from the mouth of stub chamber 31. In the upward direction the flame is quickly extinguished in chamber 15. In the downward direction the velocity of the flame front increases until a detonation wave is produced reaching velocities substantially in excess of the velocity of sound in the gas and ultimately reaching a constant velocity. The detonation wave and the gases accompanying the same strike the surface 12 of the coupling medium and impart seismic waves thereto. Following this impact, the combustion gases are expelled. The detonation tube 10 is cooled in the wake of each detonation wave. As a result, coupling liquid tends to be drawn into the tube 10. Under some conditions, liquid has been projected not only up in tube 10 but through chamber 15, tube 20 and back into the lines leading from the sources 16, 17 and 18.

It has been found that by locating the igniter 30 in a branch path or chamber formed by the element 31 that the igniter is sufficiently shielded to remain free from fouling so that acoustic pulses may be generated repeatedly and reliably. Thus, in accordance with one aspect of the invention, the offset of the igniter in a properly oriented stub chamber provides effective shielding.

In a further aspect of the invention, the igniter is shielded by use of a plurality of valves such as valves 40 and 41. The valves are illustrated in such form as to emphasize their function. They comprise hinged flaps which seal openings in the walls of the tube 10 when pressure inside the tube exceeds the pressure on the outside. When atmospheric pressure outside the tube exceeds the pressure inside the tube, the valves 40 and 41 open to permit the flow of atmospheric air therein, equalizing the pressure to prevent suction of the coupling liquid into the system. In practice, valves 40 and 41 were of the type manufactured and sold by the Wm. Powell Co. under the tradename of Powell Swing Check Valves. Four valves were employed at inlet ports of 1" diameter, all located about two feet below section 14. The valves 40 and 41 thus served effectively to help shield the igniter 30 and prevent fouling thereof.

In operation of the system thus far described, the boat 13 proceeds along a charted course towing a spread of seismic detectors connected to a cable 45. Cable 45 is maintained at a substantially uniform depth by a float 46 and a depth vane 47 suitably coupled together and to the boat 13. Signals from the cable 45 are applied by way of the reel 47a and amplifier 48 to a recorder system, preferably including a compositor system 49. A compositor is preferred for combining signals from cable 45 from successive seismic waves prior to application of the combined signals by way of channel 50 to the recorder 51. Preferably a precision power supply 52 is employed to drive compositor motor 53, and motor 54 for the recorder 51 in a predetermined relationship.

A shaft 55 leading from motor 54 supports a plurality of switch cams. Cam 56 serves to actuate the control element 34 (a suitable microswitch) which controls pulser 33 so that combustion will be initiated repetitively and in synchronism with the chart recorder 51 and the compositor 49.

It has been found that flow of combustible gas as from sources 17 and 18 need not be continuous in certain operations. Propane, for example, is required in the system only about one-half of the time for pulse repetition rates of the order of 20 pulses per minute. In order to control and limit gas flow, cam 57 mounted on shaft 55 periodically closes a control element which may be in the form of a microswitch 58. Switch 58 is connected in the control circuit of a relay 59 by way of conductors 68 and 69. The control circuit includes battery 70. Upon closure of the relay 59, power is applied from a source 59a to a solenoid coil 59b which actuates a valve 60. The circuit may be traced from one side of closed relay contacts 59c, conductor 72, solenoid coil 59b, source 59a, conductor 73, and thence to one side of closed contacts 59c. Flow of a combustible fluid as from source 18 into the channel 20 is thus controlled and may be limited to a predetermined interval during each cycle immediately prior to ignition. Cam 57 may be adjusted to terminate flow of the combustible fluid through valve 60 coincident with each ignition and to re-establish flow after a lapse of about 1½ seconds. Flow of air from source 16 preferably is continuous in order to flush combustion products from the detonation tube. In any event flow of combustible fluid is re-established in time to introduce a combustible mixture into tube 10 for generation of a succeeding impulse. A substantial economy in the amount of combustible gas thus employed may be effected.

In a similar manner cam 61 actuates a microswitch 62 which is connected in circuit with battery 67 by way of conductors 65 and 66 as to control a relay 63. Closure of the relay switch applies power from source 59a to a solenoid coil 63b which controls valve 64. The circuit effective to control valve 64 may be traced from one side of the closed relay contacts 63c, conductor 70, solenoid coil 63b, source 59a, conductor 71 and thence to the opposite side of the closed relay contacts 63c. Flow of oxygen from source 17 may thus be limited in accordance with the same or a different schedule as above described for the combustible fluid from source 18.

In operations where continuous flow of fluid from sources 17 and 18 is desired, the switches 58 and 62 may be positioned out of operative relation with respect to cams 57 and 61, respectively. Alternatively, the circuits leading to relays 59 and 63 may be provided with suitable control selectively to open or close the same.

In one embodiment of the invention the lower portion of the detonation tube 10 was formed of a length of pipe 22' long and 6" in diameter. The outlet end 11 was reduced down to 4" in diameter. The upper portion 14 of the detonation tube was 2' long and 2" in diameter. The stub chamber 31 comprised a short length of 1¼" pipe closed at the end. It was found preferable to locate the igniter 30 a distance of the order of about 3" from the center of the section 14.

The mixing chamber 15 was a 21" section of pipe 4" in diameter with six baffles 15a therein spaced about 3" apart. Each baffle extended from the wall of chamber 15 to a point ¼" beyond the axis thereof so that the edges of the baffles overlapped each other by about ½".

In the mixing system flow rates of the following order were used. Liquid propane was fed from source 18 at a rate of 12½ gallons per hour. Flow of gaseous oxygen was at the rate of 750 cubic feet per hour. With the above flow rates preset, flow of compressed air was gradually increased until repetitive firing took place. Air flow generally was maintained at about the order of 145 cubic feet per minute at 100 p.s.i. In the ignition system a voltage of the order of 5,000 volts was applied to a spark gap of about ⅛". Power of the order of 1.5 watt seconds was thus employed.

Air, oxygen, and gas mixing units are shown at 19, 19a. It should be noted that the mixing chamber serves the dual function of mixing the gas components and extinguishing structure whereby, upon ignition of the gas mixture, combustion proceeds in both directions from the stub chamber 31. A detonation wave is produced in the downward direction as above described. In the upward direction, combustion ultimately is extinguished in its travel through chamber 15 so that the tube may immediately be recharged with the combustible gas without continuous burning.

Having described the invention it will now be appreciated that applicant has provided a repetitive seismic source of increased reliability. The stub chamber 31 and the valves 40 and 41 taken alone will serve to improve reliability. Together they approach optimum performance of the system. The waves produced by the system are suitable for conducting seismic exploration to depths of several thousand feet, providing on chart recorder 51 a graphic portrayal of variations in subsurface lithology. The source is particularly suitable in that the predominant frequency of the resultant waves lies within the frequency band ordinarily employed in seismic exploration, i.e., of the order of from 30 to 200 cycles per second.

While acoustic pulses of high energy are produced when air, oxygen and combustible fluid such as propane form the combustible mixture, it should be understood that where operation at lower acoustic level is satisfactory, a simplified source system may be employed. More particularly, it has been found that air and L.P.G. introduced through a simple T connection at the top or inlet of chamber 15 will be so mixed in passing through the tortuous passage therein that reliable repetitive operation may be achieved. In one such system a mixing chamber 15 of the type above-described was employed in conjunction with a detonation tube source in which the lower portion thereof was 3" in diameter and of length of about 23'. In the latter case the detonator or spark plug 30 was fitted directly into a T connection located at the lower or outlet end of the mixing chamber 15.

It will also be appreciated that different types of mixing units may be employed in place of units 19 and 20. In one embodiment of the invention, the oxygen-air mixing unit 19 was eliminated and in its place a mixing unit such as unit 15 was employed. Oxygen and air were combined in a common stream in a T connection at the input of such chamber. The output of such chamber was then connected to unit 20 whose output in turn was fed to the top of the unit 15 in the manner illustrated in FIG. 1.

Having described the invention in connection with certain embodiments thereof, it will now be understood that further modifications will suggest themselves to those skilled in the art and it is intended to cover such modifications as fall within the scope of the appended claims.

What is claimed is:

1. A seismic energy source comprising an elongated pipe adapted to be supported from a water-borne craft with the lower end positioned for immersion and having a combustion zone in the upper end of said pipe, means connected to the upper end of said pipe for delivering to said combustion zone a combustible gas mixture for continuous flow through said pipe, an offset tube connected to and extending from said pipe at said combustion zone, igniter means mounted in said offset tube, means electrically connected with said igniter means for periodically energizing said igniter means to initiate combustion of said mixture whereupon a combustion wave is produced as combustion travels downwardly through said pipe, and valve means mounted in the wall of said pipe below said combustion zone above said lower end responsive to pressure outside said pipe in excess of pressure inside said pipe for equalizing low pressures in the wake of each said combustion wave.

2. A device for producing seismic impulses comprising an elongated tubular member, said member having at least three zones including a top combustion zone having means adapted to be connected to a source of fuel and an ignition means, an intermediate zone having at least one inwardly opening valve therein, and a lower immersion zone adapted to be inserted in a body of water or the like.

3. The device of claim 2 in which said valve is a check valve mounted in wall structure of said intermediate zone and responsive solely to a pressure differential produced by atmospheric pressure exceeding pressures within said intermediate zone for admitting atmospheric air into said intermediate zone.

References Cited in the file of this patent

UNITED STATES PATENTS

| | | |
|---|---|---|
| 1,500,243 | Hammond | July 8, 1924 |
| 2,353,484 | Merten et al. | July 11, 1944 |
| 2,550,515 | Anderson | Apr. 24, 1951 |
| 2,766,837 | McCollum | Oct. 16, 1956 |
| 2,772,746 | Merten | Dec. 4, 1956 |